Dec. 4, 1962
E. L. FLEMING ETAL
3,066,503
FORMED TUBE COUPLING
Filed May 23, 1961
2 Sheets-Sheet 1
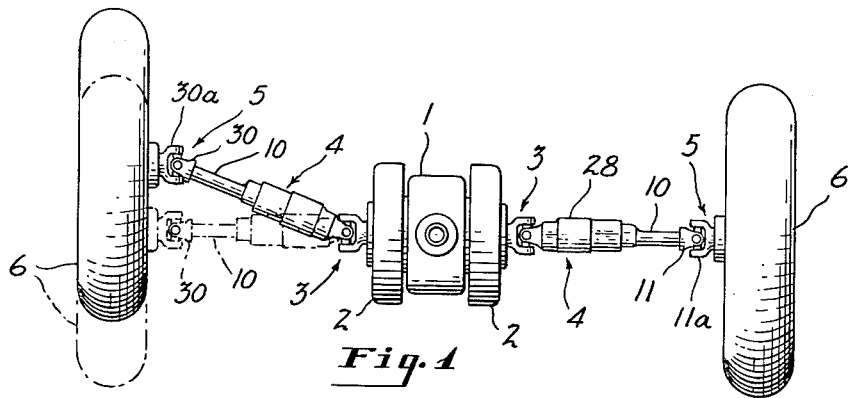
Fig. 1
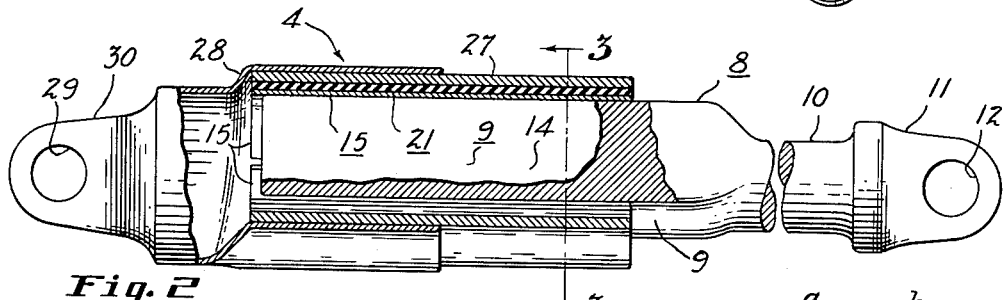
Fig. 2
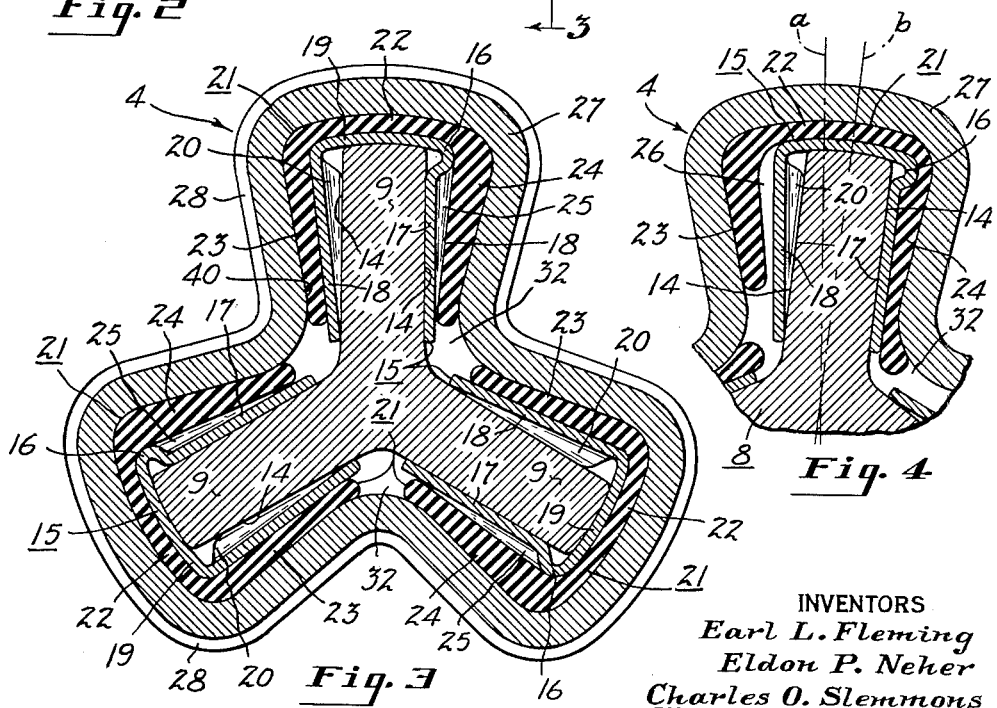
Fig. 3
Fig. 4
INVENTORS
Earl L. Fleming
Eldon P. Neher
Charles O. Slemmons
BY McCoy, Greene & deGrotenhuis
ATTORNEYS Dec. 4, 1962  E. L. FLEMING ETAL  3,066,503
FORMED TUBE COUPLING
Filed May 23, 1961  2 Sheets-Sheet 2
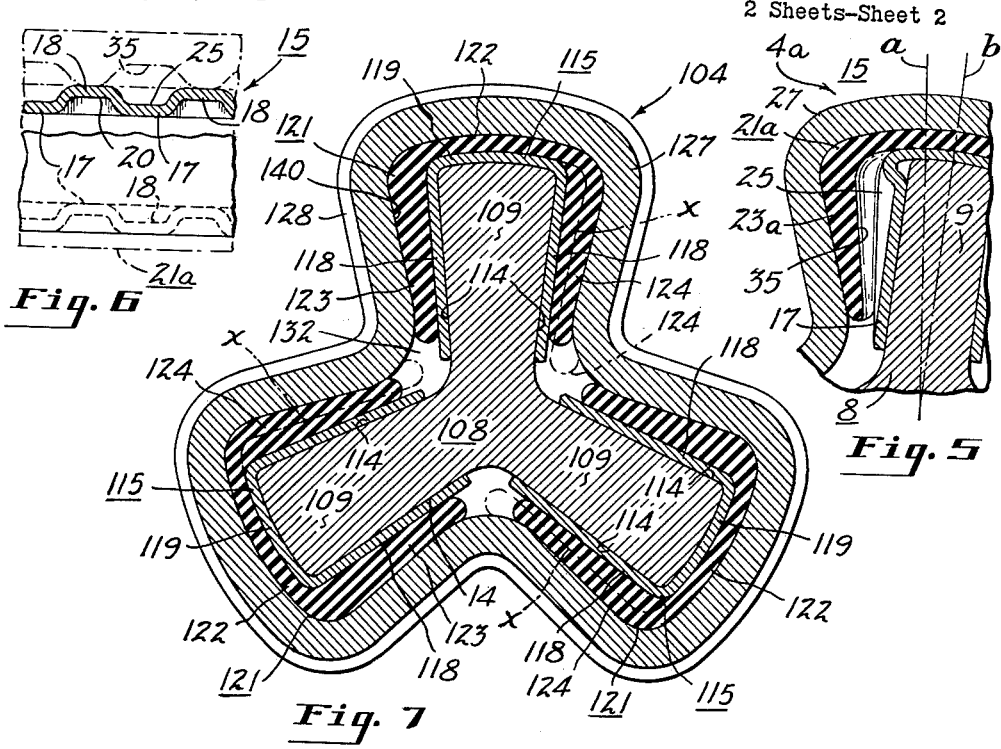
INVENTORS
Earl L. Fleming
Eldon P. Neher
Charles O. Slemmons
BY McCoy, Greene & TeGrotenhuis
ATTORNEYS

United States Patent Office 3,066,503
Patented Dec. 4, 1962

3,066,503
FORMED TUBE COUPLING
Earl L. Fleming, Flushing, and Eldon P. Neher, Hillsdale, Mich., and Charles O. Slemmons, Akron, Ohio, assignors to The General Tire & Rubber Company, Akron, Ohio, a corporation of Ohio
Filed May 23, 1961, Ser. No. 112,062
11 Claims. (Cl. 64—27)

The present invention relates to flexible driving connections for power transmitting shafts and more particularly to resilient slip couplings having splines cushioned by elastic rubber and constructed to permit axial sliding of the splines relative to the rubber cushions without excessive wear or noise.

Heretofore, splines have been provided in power shafts in conjunction with universal joints to permit the necessary axial sliding movement when the ends of the driving shaft were moved transverse to the axis of rotation. Such splines have produced a considerable amount of noise and the transmission of high torque during sudden starts and stops has resulted in substantial wear, not only on the splines and the universal joints, but also on other gears of the power transmitting apparatus. In the case of automobiles, the sudden torque loads have often resulted in splipping of the rear wheels and excessive wear of the tires.

Although driving connections have been provided prior to this invention that cushioned torque loads, it was not known how to provide a reliable commercially practical cushioned driving connection which could transmit the extremely high torque loads encountered, for example, in a modern automobile and which could also provide effective cushioning.

The present invention provides an inexpensive durable elastic spline for power transmitting shafts, such as the propeller shaft of an automobile, which permits an extremely large amount of axial movement so as to permit large angular variation in the position of the axis of rotation, for example, when the wheels of an automobile move over a bump in the road. The elastic spline minimizes friction, noise and vibrations and at the same time, cushions torque loads so as to eliminate slipping of the wheels of the automobile or damage to the power transmitting parts, such as the gears and the universal joints. The spline may be constructed to transmit very high torques and to permit sufficient angular cushioning movement to absorb sudden shocks.

The flexible driving connection of this invention includes a spline shaft having a plurality and preferably no more than four splines of radially elongated cross section, a driving member in the form of a fluted tubular sleeve shaped to provide spline receiving grooves, relatively thin bearing means slidably mounted on the splines, and elastic rubber cushioning means interposed between the bearing means and the fluted sleeve for spacing the sleeve from the spline shaft while holding the bearing means against the splines and yieldably resisting angular movement of the spline shaft relative to the sleeve. The bearing means are preferably relatively thin and flexible so that the pressure of the rubber cushioning means insures good surface contact to the spline shaft. The construction minimizes noise and vibration which is typical of the splines known prior to this invention.

The bearing means may be made up of steel or other metal or may be made of a suitable plastic material.

For ease of assembly and in order to minimize the cost of manufacture and to improve the product, it is preferable to construct the bearing means and the cushioning means as separate inserts, one for each spline.

An object of the present invention is to provide a simple, inexpensive driving connection for power transmitting shafts which effectively cushions torque loads and permits a large amount of axial elongation and contraction to permit jouncing of the driving connection through large angles during rotation thereof.

A further object of the invention is to provide a durable low friction spline which minimizes noise and vibrations and is capable of transmitting high torques.

Other objects, uses and advantages of the present invention will become apparent to those skilled in the art from the following description and claims and from the drawings in which:

FIGURE 1 is an end elevational view on a reduced scale with parts omitted showing a portion of a vehicle which employs the flexible driving connections of the present invention, the parts on one side of the vehicle being shown in dot-dash lines in their normal positions when the vehicle is driving over a flat, horizontal surface and being shown in solid lines in their positions as the wheel moves over a hump in the road;

FIGURE 2 is a fore-shortened elevational view on a reduced scale with parts broken away and shown in section showing the flexible driving connection of this invention;

FIGURE 3 is a sectional view taken on the line 3—3 of FIG. 2 and on a larger scale, the parts being shown in their positions when no torque is applied;

FIGURE 4 is a fragmentary, sectional view similar to FIG. 3 and on the same scale but showing the position of the parts when an extremely high torque is applied, the angular rotation caused by such torque being shown by dot-dash lines $a$ and $b$ representing the location of the medial plane of one spline before and after the torque is applied;

FIGURE 5 is a fragmentary sectional view similar to FIG. 3 showing a modified form of driving connection according to the present invention, the parts being shown in their positions when an extremely high torque is applied as in FIG. 4;

FIGURE 6 is a fragmentary top plan view of the fluted sheet metal insert used in the driving connections of FIGS. 1 to 5 with parts broken away and shown in section, the rubber insert of FIG. 5 being shown in dot-dash lines as it appears when a high torque is applied as in FIG. 5;

FIGURE 7 is a sectional view similar to FIG. 3 and on the same scale showing a modified form of the invention, portions of the assembly being shown in solid lines in their positions when no torque is applied and in dot-dash lines in their positions when a high torque is applied;

FIGURE 8 is a fragmentary elevational view on a reduced scale with parts omitted and parts broken away showing a different application of the flexible coupling of this invention in an automotive vehicle;

FIGURE 9 is a sectional view similar to FIG. 3 and on a reduced scale showing a modified form of driving connection according to the present invention; and FIGURE 10 is a sectional view similar to FIG. 9 showing another modified form of driving connection according to the present invention.

Referring more particularly to the drawings which are drawn to scale and in which like parts are identified by the same numerals throughout the several views, FIG. 1 shows a rear portion of an automobile having a differential 1 connected through the conventional driving elements to the engine (not shown). A pair of conventional brakes 2 is provided on opposite sides of the differential to stop the rotation of the rear wheels 6. The power is transmitted from the differential to the wheels 6 through a pair of conventional universal joints 3, a pair of flexible driving connections 4 and a pair of conventional universal joints 5 as indicated in FIG. 1. Each driving connection 4, which is shown in detail in FIGS. 2, 3 and 4, must extend axially to permit vertical movement of one rear wheel, for example, from its normal position shown in dot-dash lines in FIG. 1 to an elevated position substantially in vertical alignment therewith as shown in solid lines in that figure.

The flexible driving connection of the present invention, as shown herein, comprises a high strength steel spline shaft 8 having three regularly circumferentially spaced radially projecting portions 9 of substantially rectangular cross section as best shown in FIG. 3 which is drawn substantially to scale. The shaft 8 has an elongated generally cylindrical portion 10 and an enlarged yoke 11 with a pair of cylindrical openings 12 therein. The radially projecting portions or splines 9 have flat side surfaces 14 extending parallel to the axis of the shaft from the cylindrical portion 10 to the end of the shaft. The opposite surfaces 14 of each spline may be inclined slightly relative to each other but are shown herein as being substantially parallel.

Thin bearing means or liner means are provided that substantially surround the spline shaft. Such means comprise thin hard flexible channels 15, each extending around one of the splines 9. The channels are preferably fluted sheet metal inserts.

One of the sheet metal inserts 15 is mounted on each of the three splines 9 and extends axially along at least ⅔ the length thereof. Each insert has rounded radially outer edge portions 16, spaced flat portions 17 extending radially inwardly from the portions 16 and engaging the flat spline surface 14, and an outer portion 19 of generally arcuate cross section substantially coaxial with the spline shaft extending between the edge portions 16. The insert has space flat portions 18 which, like the portions 17, are parallel to the axis of the shaft 8 and extend to the radially inner end of the associated spline 9. The flat portions 17 and 18 of each insert 15 are offset to provide tapered grooves 20 and 25 on the inner and outer surfaces as best shown in FIG. 6 which is drawn substantially to scale. If desired the grooves 20 and 25 may be used as grease pockets to keep the device lubricated.

Each insert or channel 15 has a generally U-shaped cross section and engages the inside surface of an elastic rubber insert 21 which is a channel of U-shaped cross section. Each rubber insert has a circumferential portion 22 of arcuate cross section coaxial with the insert portion 19 and the spline shaft 8 and has tapered side portions 23 and 24 which gradually decrease in thickness in a direction generally toward the axis of rotation. When no torque is applied the side portion 23 engages the flat insert portions 18 of the associated metal insert as shown in FIG. 3. If desired, it may also fill adjacent grooves 25. The tapered side portion 24 of the rubber insert engages the flat insert portions 18 of the associated metal insert but may be normally spaced from the flat insert portions 17 to provide normal clearance spaces at the grooves 25 which gradually decrease in width toward the radially inner end of the rubber insert. The rubber insert 21 may touch the radially inner end of the portion 17 before torque is applied without interfering with the operation of the driving connection. When a very high torque is applied, as indicated in FIG. 4, the insert portion 18 may move circumferentially away from the rubber insert portion 23, leaving a tapered chamber 26. The size of such chamber, if any, depends on the initial compression of the portion 23. Such chamber is eliminated when the application of the torque is discontinued. The portions 23 and 24 of the rubber inserts have sufficient thickness to press both sides of each insert 15 against the opposite side faces of the associated spline 9 when the torque load is eliminated and preferably are under sufficient compression to maintain contact with both sides of the insert at low torque values.

The flexible driving connection 4 includes an outer sheet metal sleeve 27 which is fluted to provide a spline member having a cross section as shown in FIGS. 3 and 4. A tubular driving member 28 is welded to or otherwise rigidly connected to the sleeve 27 and has a yoke 30 at its outer end with a pair of cylindrical openings 29 therein similar to the openings 12. The yokes 11 and 30 and the corresponding yokes 11a and 30a of the conventional universal joints 5 and 3, respectively, may be of substantially the same size and constructed in a similar manner to receive the bearing cups of the universal joints (see for example, U.S. Patent No. 2,770,114 and U.S. Patent No. 2,773,368). Such universal joints have the trunnions at the ends of spiders located within the bearing cups in the usual manner, and a description of such conventional apparatus is unnecessary for an understanding of this invention.

It will be apparent from the drawings that the major portion of the torque load is taken up by compression of the rubber of the rubber inserts 21. It is desirable, however, to have a substantial part of the torque load taken by shear rather than compression of the rubber particularly at low torque loads. The elastic-spline slip couplings of FIGS. 1 to 9 are designed in this manner. In the devices of FIGS. 1 to 5, for example, the radially outer portions of the metal inserts, which are arcuate in cross section, each extend circumferentially through an angle in the neighborhood of 30°, the three inserts extending circumferentially about 90° out of the total 360°. These portions may extend anywhere from 20° to 40° but preferably extend at least 30° so that a large part of the torque load may be taken in shear.

The portions of the (three) rubber cushions radially outwardly of the splines preferably extend a total of about 80° to 150° around the circumference. As shown in FIGS. 3 and 5, the radially outer portions (22 or 122) of each rubber insert extend about 30° to 40° circumferentially and are substantially coaxial with the spline shaft so that a large portion of the torque load is taken in shear.

The three rubber inserts provide elastic rubber cushioning means substantially surrounding the thin sheet metal bearing means and the spline shaft and holding the fluted sleeve 27 in a position spaced from and coaxial with the spline shaft while yieldably resisting angular movements of the shaft relative to the sleeve.

The sheet metal bearing means is preferably inside the cushioning means rather than outside such cushioning means and is located to slide axially on the spline shaft rather than on the fluted sleeve. The channels of the bearing means and the cushioning means are preferably separate inserts. It will be apparent, however, that advantages of this invention may be obtained with constructions quite different from those shown in the drawings.

The resilient slip coupling or driving connection 4 may be assembled by placing the three rubber inserts 21 within the three splined grooves or recesses 40 of the fluted sleeve 27 so that the ends of the rubber inserts are aligned with the ends of the sleeve as indicated in FIG. 2. The metal inserts 15 may be placed within the rubber inserts either before or after the insertion of the rubber inserts into the sleeve 27. If it is desired, the rubber inserts may be cemented or otherwise bonded to the sleeve 27 within the grooves 40 but this is not essential. As herein shown, the inserts 15 and 21 both have a length corresponding to the length of the sleeve 27. The insert 15 is fluted but the insert 21 has a uniform cross section throughout its length. After all of the inserts have been properly located within the fluted sleeve, the spline shaft 8 is moved axially into the sleeve to put the rubber under compression. The three splines 9 of the shaft may be tapered somewhat to facilitate entry of each spline between the straight portions 17 and 18 of the associated metal insert 15 whereby the insert is gradually expanded and the rubber insert is gradually compressed. The end portion 19 of each metal insert can be tapered slightly adjacent its radial and circumferential end edges to facilitate assembly and to permit some radial compression of the rubber insert 21, particularly the portion 22 thereof. The friction between the metal insert 15 and the rubber insert 21 is sufficient to prevent axial movement therebetween when the spline shaft 8 slides axially, particularly because of the grooves 25.

It will be understood that the inserts 15 may be made partially or entirely of plastic material such as nylon or the like rather than steel or other metal. A plastic-coated steel insert would provide excellent results.

The operation of the elastic splines of this invention is very efficient. The rubber inserts 21, for example, provide torsional cushioning without interfering with axial sliding of the spline shaft 8 and also minimize the noise and vibrations characteristic of splined connections. Wear is also minimized. The cushioning of the torque in an automobile is very advantageous as it eliminates skidding of the wheels under sudden torque loads and reduces damage to the gears and other parts.

The elastic spline shown herein is designed to obtain the maximum amount of compression of the rubber for a given diameter. The greatest part of the torque load is taken in compression rather than in shear, but it is advantageous to design the rubber inserts so that their circumferentially extending portions 22 extend circumferentially a substantial distance (i.e., not materially less than the distance the radial portions 23 and 24 extend radially). In this way a substantial part of the load is taken in shear. It is preferable to employ only three or four splines 9 because of the advantages of taking up part of the load in shear. The result of the construction shown herein is more efficient cushioning of the torque loads and more effective isolation of noise and vibration. The construction also reduces the cost of the elastic spline assembly. The thin metal inserts 15 in combination with the pressure of the rubber inserts 21 insures proper contact between the splines 9 and the inserts so that the axial sliding movement is obtained without noise and vibration and without excessive wear.

The assembly is inexpensive to manufacture since the parts can be made by forming rather than machining operations. The sleeve 27, for example, if separate from the member 28, can be made of seamless tubing and can be cold formed by drawing axially over a suitable mandrel to iron the spline surfaces therein. The tubular driving member 28 can be formed in a similar manner to fit the sleeve 27 before these parts are welded together. The sheet metal inserts 15 can readily be formed without expensive machining operations. The costs are also minimized since high accuracy is not essential. It will be apparent that the rubber inserts 21 may be vulcanized economically and efficiently and that high accuracy is not essential for these parts.

It is well known that rubber, like water, is substantially incompressible and that flow of the rubber is necessary to permit reduction in the thickness thereof. FIGS. 3 and 4 illustrate the flow of the rubber under the application of torque. The grooves 25 are adapted to receive the rubber of the adjacent portion 24 so as to permit a relatively large angular movement of the spline shaft relative to the driving member 28. Such grooves also reduce the initial force necessary to start the relative angular movement of the parts so that a softer cushioning action is obtained initially. The vertical dot-dash line $a$ in FIG. 4 indicates the normal position of the medial plane of one spline portion 9 when the parts are in the no-torque position shown in FIG. 3; and the dot-dash line $b$, which intersects the line $a$ at the axis of rotation, indicates the position of such medial plane when maximum torque is obtained. FIGURE 4, therefore, indicates the deformation of the rubber insert and the position of the parts at the instant of said maximum surge torque obtained when the automobile of FIG. 1 is in low gear.

It will be understood, of course, that the maximum surge torque will vary in different vehicles and that the driving connection 4 may be modified for different power shafts. Since each metal insert is relatively thin and is subjected to the pressure of the rubber, there is a maximum surface contact between the flat portions 17 and the spline portion 9 which transmits the torque forces without causing undue wear as the spline shaft slides axially to accommodate jounce.

The metal bearing means surrounding the splines 9 of the shaft 8 may be formed as one or several pieces. Such means are preferably relatively thin and flexible so as to be held by the rubber in engagement with the opposite radial surfaces of the spline. As shown, such bearing means are in the form of three flexible metal channels 15.

The elastic rubber cushioning means or liner means may also be formed in one piece rather than as three channels 21, but the spaces 32 between the adjacent channels facilitate flow of the rubber.

The elastic rubber inserts 21 may be placed under considerable compression when the driving connection 4 is assembled by inserting the spline shaft 8. The amount of compression would, of course, be limited by the friction developed between the spline shaft and the metal inserts 15 as the unit is assembled. This friction could be reduced during assembly by the use of a lubricant.

Compression of the rubber insert portions 23 and 24 is desirable to minimize the width of the clearance space 26 when high torques are applied. It would be preferable to have the rubber side portion 23 remain in contact with the metal insert 15 at all times. A convenient way to accomplish this is to provide a series of grooves in the rubber side portion as shown, for example, in FIG. 5.

FIGURE 5 shows a flexible driving connection 4a which is constructed exactly the same as the driving connection 4 and is used in exactly the same way except that the rubber insert has a thicker side portion 23a with a multiplicity of regularly spaced grooves 35 therein.

The metal insert 15 used in the driving connections 4 and 4a is fluted or corrugated throughout its length as indicated in FIG. 6 so as to provide tapered inner and outer grooves 20 and 25. If desired, these grooves may be filled with suitable lubricants but this is not essential. The grooves 35 of the elastic rubber insert 21a are aligned with these grooves as shown in dot-dash lines in FIG. 6.

FIGURE 5 shows the position of the parts as in FIG. 4 the line $a$ indicating the no-torque position and the line $b$ indicating the maximum-surge-torque position. Under the maximum surge torque as indicated in FIG. 5 the compression of the rubber side portion 23a is almost eliminated but the projecting portions between the grooves 35 remain in contact with the flat portions 18 of the metal insert 15. As the torque is reduced the other side portion of the rubber insert corresponding to the side portion 24 will force the metal insert back to the no-torque position $a$ and thereby force the incompressible rubber of the side portion 23a into the grooves 35.

The rubber may be removed from the side portion in various ways, or air pockets may be formed therein to facilitate compression of such side portion, but it is preferred to employ grooves or otherwise construct the rubber side portion so that the radially inner end thereof does not move a substantial distance radially. The radial movement of the radially inner end of the side portion 23, for example, as indicated in FIGS. 3 and 4 is somewhat undesirable since lubrication might be necessary to reduce scrubbing and damage to the rubber after a substantial period of time. It will be apparent to those skilled in the art that the rubber inserts may be designed in various ways to provide the proper amount of radial movement when torque is applied and released so that the driving connection will have an extremely long life.

FIGURE 7 shows a flexible driving connection 104 which is exactly the same as the flexible driving connection 4 except that the spline shaft is redesigned somewhat and the rubber and metal inserts are shaped somewhat differently.

An examination of FIGS. 1, 2 and 7 will, therefore, make the structure apparent to the eye, considering FIG. 7 as being taken on the line 3—3 of FIG. 2. It is seen that the spline shaft 108 is the same as the shaft 8 except that the radially projecting portions 109 have a uniform tapered cross section rather than the substantially rectangular cross section of the spline portions 9. The opposite side surfaces 114 of each spline 109 are flat and slidably engage the flat portions 118 of the associated sheet metal insert 115, the insert conforming to the spline with the arcuate portion 119 engaging the arcuate outer surface of the spline as shown in FIG. 7. It is thus seen that there are no grooves corresponding to the grooves 20 and 25 associated with the fluted inserts 15. Cushioning means in the form of elastic rubber inserts 121 are provided having a uniform U-shaped cross section similar to that of the inserts 21, each insert having a circumferential portion 122 engaging the arcuate portion 119 of the associated metal inserts and having tapered side portions 123 and 124 engaging the flat portions 118. The inserts 115 and 121 have the same axial length as the inserts 15 and 21 and extend the full length of the fluted sleeve 127 carried by the driving member 28. The rubber inserts 121 conform to the associated metal inserts 115 and may be compressed between such inserts and the sleeve 127 to assist in maintaining the rubber in contact with both sides of each metal insert at all times. The rubber inserts hold the metal inserts against both side faces of each spline 109. If desired, the rubber inserts may be bonded to the sleeve 127 in the grooves 140 thereof, but this is not essential. It is preferred to place the side portions 123 and 124 under sufficient compression to maintain both said side portions in contact with the metal insert 115 at all times, even when a high torque is applied.

The fluted sleeve 127 is exactly the same as the sleeve 27 except that the tapered spline-receiving grooves 140 are narrower than the grooves 40. The driving member 128 is the same as the member 28 including the yoke 30 thereof except that it is shaped to conform to the sleeve 127. The driving connection 104 is assembled substantially in the same manner as the connection 4, the splines 109 being slid axially into the inserts 115 after the three rubber inserts 121 and the three metal inserts 115 have been placed within the sleeve 127 to place the rubber under compression.

The operation of the flexible driving connection is generally the same as that of the connection 4. FIGURE 7 shows the position of the parts before torque is applied and the dot-dash lines indicate the position $x$ when maximum torque is applied, as when starting rapidly in first gear. This may be called the maximum surge torque. It will be apparent from the dot-dash lines that the rubber flows radially inwardly between the flat portions 117 of the metal insert and the adjacent radially inwardly extending portions of the fluted sleeve 127 toward the spaces 132. Again a substantial part of the load is taken up in shear by the circumferential portions 122, the major portion of the load being taken in compression. The spline shaft 108 slides axially in the inserts 115 to permit the up and down movement of the wheels 6 shown in FIG. 1.

In the assemblies 4 and 104 described above the cushioning means surrounding the spline shaft consist of three separate channels 21 or 121 each having the same cross section throughout its length as shown in FIGS. 3 or 5.

It will be apparent from these figures, which are drawn to scale, that the steel inserts 15 and 115 are of uniform thickness and have a thickness which is a small fraction of the thickness of the associated elastic rubber insert 21 or 121. The radially outer portion 22 or 122 of each rubber insert has a thickness which is preferably substantially uniform and may, for example, be about 1½ to 5 times the thickness of the associated metal insert 15 or 115. The thickness of the radially extending portions 23 and 24 of the rubber insert 21 and the corresponding portions 123 and 125 of the insert 121 gradually decreases in a direction generally toward the center of the spline shaft. In a device of the type shown in the drawings the average thickness of each of said inwardly extending portions may, for example, be two to five times the thickness of the associated metal insert 15 or 115 and the minimum thickness at the radial inner ends of said portion may be much greater than the thickness of the metal insert. The relative thicknesses may vary considerably but it will be understood that the flexible driving connection of the present invention is constructed to permit substantial angular movement of the spline shaft relative to the fluted sleeve 27 or 127 as indicated, for example, by the solid lines in FIG. 4 or the dot-dash lines in FIG. 7.

It will be noted that the spline-receiving grooves of the sleeves 27 and 127 gradually decrease in width toward the axis of rotation so as to accommodate the tapered side portions of the rubber inserts. It will be apparent to those skilled in the art that such tapered construction is required because of the fact that the outer ends of the splines 9 or 109 move a greater distance circumferentially than the inner ends for any given angular rotation relative to the sleeve 27 or 127.

It should be apparent from the above description that the flexible driving connection of the present invention is well suited for various power transmitting shafts other than those used on automobiles. It should also be apparent that such driving connection may be employed at many different locations on an automotive vehicle. FIGURE 8 shows the use of such flexible driving connection between the transmission 50 and the differential 51 of an automobile so as to accommodate the up and down movement of the differential and to permit the misalignment of the different power transmitting shafts.

This figure shows an automobile having a conventional frame 53 supported in the usual manner from the rear axle by a pair of conventional leaf springs 52 at the rear of the vehicle, the differential 51 being located midway between the rear wheels (not shown). The parts are broken away in FIG. 8 to show the differential. The power is transmitted from the power transmitting shaft of the transmission 50 to the differential 51 through a flexible driving connection 4' which is identical with the driving connection 4 described above except that the cylindrical portion 10 of the spline shaft 8 is replaced with a tubular propeller shaft 10' of much greater length extending from the splines 9 to the yoke 11. Such yoke is connected to a conventional universal joint 5' which is substantially identical to the universal joint 5 so as to drive the gears of the differential. The yoke 30 at the opposite end is connected to the universal joint 3' which is the same as the joint 3 described above.

It will be understood that the term "spline" is used herein in the normal sense to cover axially sliding splines and that the outer, side and peripheral surfaces of such splines will conform substantially to a non-circular cylindrical surface generated by moving a line parallel to the axis of rotation of the spline shaft. It will be apparent from the drawings that the outer surfaces of the spline portions of the shafts 8 and 10 and the inner surfaces of the sleeves 27 and 127 are regular non-circular cylinders which intersect any plane containing the axis of rotation of the spline shaft along lines parallel to such axis. The same is true of the inner and outer surfaces of the metal insert 115 and the rubber inserts 21 and 121; but it will, of course, be apparent that the structure may be modified somewhat without substantially affecting the mode of operation.

In the flexible driving connections described above the bearing means engaging the spline shaft 8 or 108 and the cushioning means engaging the inner surface of the fluted sleeve 27 or 127 are formed as separate pieces. FIGURE 9 shows a modified form of the present invention wherein the bearing means and the cushioning means are peripherally continuous. The flexible, axially movable, driving assembly 204 shown in this figure has a spline shaft 208 similar to the shafts 8 and 108 and having three splines 209 of uniform radially elongated cross section. Relatively thin tubular bearing means 250 is provided which has a substantially uniform thickness and comprises a series of channels 215 each extending around and engaging one of the splines 209 so as to permit axial sliding of the shaft 208 relative to the bearing means 250 while preventing angular movement between such parts. The bearing means 250 may be fabricated of nylon, polyethylene, polyformaldehyde (for example, "Delrin" marketed by the E. I. du Pont Company), polytetrafluoroethylene (for example, a material marketed under the trade name "Teflon"), or other suitable plastic material. The bearing means 250 may also, as herein shown, be made of a metal such as brass or steel. In such case the material should preferably bear a thin coating of a bearing material such as the polyformaldehyde or polytetrafluoroethylene mentioned just previously.

Tubular elastic rubber cushioning means 260 are provided having a series of channels 221 extending around the channels 215 of the bearing means. A fluted sheet metal sleeve 227 is provided which conforms generally to the shape of the spline shaft 208, the bearing means 250 and the cushioning means 260. The sleeve is generally similar to the sleeves 27 and 127 described above and is provided with spline-receiving grooves 240 for receiving the splines 209 and the channels 215 and 221. If desired, the rubber of the cushioning means 260 may be compressed radially between the bearing means 250 and the sleeve 227.

FIGURE 10 shows a modified form of driving assembly 304 constructed to receive a spline shaft 308 having four splines 309. Such shaft may be a tubular shaft wherein the splines are formed by deforming the tube from a circular cross section to the cross section shown in FIG. 10. Relatively thin bearing means 350 surround the spline shaft and engage the shaft throughout its periphery, said means comprising four channels 315 each extending around one of the splines 309. An elastic rubber cushioning means 360 is provided which surrounds the bearing means 350 and engages the same throughout its periphery to press it against the spline shaft while holding it against axial movement. The cushioning means comprises four rubber channels 321 extending around the channels 315 and fitting in the spline-receiving grooves 340 of the fluted tubular sleeve 327. The bearing means 350 may be made of a suitable metal such as steel, or, as herein shown, may be made of a suitable plastic bearing material, such as nylon, or polyethylene, to reduce the friction and to facilitate axial sliding of the spline shaft relative to the bearing means.

It will be apparent that the parts of the assemblies 204 and 304 shown in cross section in FIGS. 9 and 10 are non-circular cylinders so as to permit axial sliding movements of the spline shaft relative to the bearing means and relative to the fluted outer sleeve. It will also be apparent that the elastic rubber cushioning means surrounding the bearing means completely fills the space between the bearing means and the fluted outer sleeve and may be under substantial compression. The devices shown in FIGS. 9 and 10 do not incorporate voids or chambers equivalent to the chambers 32 and 132 described above.

It will readily be seen that the resilient slip coupling of the present invention may have many different applications other than those specifically described herein and that the constructional details of the flexible coupling can be varied considerably.

It will be understood that the above description is by way of illustration rather than limitation and that, in accordance with the provisions of the patent laws, reversals of parts and other variations and modifications of the specific devices shown herein may be made without departing from the spirit of the invention.

Having described our invention, we claim:

1. A flexible driving connection comprising a spline shaft having a series of radial splines, each having a radial height greater than its width, a driving member in the form of a fluted tubular sleeve having an internal surface with a shape generally similar to the shape of the splined external surface of said shaft to provide a groove for receiving each of said splines, and means mounting said sleeve substantially coaxial with said shaft for limited angular movement and limited axial movement relative to said shaft comprising relatively thin bearing means substantially surrounding said splines and elastic rubber cushioning means with a thickness several times that of said bearing means interposed between said bearing means and said sleeve and substantially surrounding said bearing means for yieldably resisting torque loads, said bearing means comprising a series of thin hard flexible channels, each extending around one of said splines and substantially conforming thereto to permit axial sliding of the spline, the radially outer portion of each of said flexible channels extending circumferentially about 30 to about 40 degrees, said cushioning means comprising a series of elastic rubber channels, each extending around one of the channels of said bearing means and holding the bearing channel against the spline while spacing the bearing channel from the fluted sleeve and resisting angular movement of the spline shaft relative to said sleeve, the portion of each rubber channel radially outwardly of the spline extending circumferentially more than 30 degrees and filling the space between said tubular sleeve and said bearing means to provide means for taking a substantial part of the torque load in shear.

2. A flexible driving connection as defined in claim 1 wherein said bearing means comprises a fluted sheet metal tube surrounding and conforming to said spline shaft.

3. A flexible driving connection as defined in claim 1 wherein the channels of said bearing means comprise separate thin flexible metal inserts, each extending around one of said splines and engaging the opposite sides thereof, and said elastic rubber channels comprise separate inserts fitting in the grooves of said tubular sleeve and extending around the metal inserts.

4. A flexible driving connection as defined in claim 3 wherein each rubber insert normally fills the space between the metal insert and the fluted sleeve and holds the metal insert in contact with the opposite side faces of the associated spline.

5. A flexible driving connection as defined in claim 3 wherein each rubber insert has radially inwardly extending portions that are compressed between the metal insert and the fluted sleeve sufficiently to remain in contact with both sides of the associated metal insert when high torque is applied through the driving connection.

6. A flexible driving connection as defined in claim 1 wherein the spline-receiving grooves of said fluted sleeve have a uniform cross section which gradually decreases in width generally in proportion to the distance from the axis of rotation and each of the solid elastic rubber channels has radially extending portions engaging the opposite side faces of the associated spline-receiving groove and gradually increasing in thickness in a direction away from said axis.

7. A flexible driving connection for automobiles or the like comprising a spline shaft having a series of radial splines, each having a radial height greater than its width, a driving member in the form of a fluted tubular sleeve having an internal surface with a shape generally similar to the shape of the splined external surface of said shaft to provide a groove for receiving each of said splines, and means mounting said sleeve substantially coaxial with said shaft for limited angular movement and limited axial movement relative to said shaft comprising relatively thin bearing means substantially surrounding said splines and elastic rubber cushioning means with a thickness several times that of said bearing means interposed between said bearing means and said sleeve and substantially surrounding said bearing means for yieldably resisting torque loads, said bearing means comprising a series of thin hard flexible channels, each extending around one of said splines and substantially conforming thereto to permit axial sliding of the spline, said channels comprising separate thin flexible metal inserts, each extending around one of said splines and engaging the opposite sides thereof, said cushioning means comprising a series of elastic rubber channels, each extending around one of the channels of said bearing means and holding the bearing channel against the spline while spacing the bearing channel from the fluted sleeve and resisting angular movement of the spline shaft relative to said sleeve, said elastic rubber channels comprising separate inserts fitting in the grooves of said tubular sleeve and extending around the metal inserts, each metal insert having a fluted side portion providing axially spaced clearance spaces of tapered cross section between at least one radially inwardly extending side portion of the metal insert and the adjacent radially inwardly extending portion of the rubber insert, whereby the rubber of said last-named portion flows into said clearance spaces when torque is applied to the spline shaft and the side portions of the rubber channel remain in contact with both sides of the associated metal insert.

8. A flexible driving connection for automobiles or the like comprising a spline shaft having a series of radial splines, each having a radial height greater than its width, a driving member in the form of a fluted tubular sleeve having an internal surface with a shape generally similar to the shape of the splined external surface of said shaft to provide a groove for receiving each of said splines, and means mounting said sleeve substantially coaxial with said shaft for limited angular movement and limited axial movement relative to said shaft comprising relatively thin bearing means substantially surrounding said splines and elastic rubber cushioning means with a thickness several times that of said bearing means interposed between said bearing means and said sleeve and substantially surrounding said bearing means for yieldably resisting torque loads, said bearing means comprising a series of thin hard flexible channels, each extending around one of said splines and substantially conforming thereto to permit axial sliding of the spline, said channels comprising separate thin flexible metal inserts, each extending around one of said splines and engaging the opposite sides thereof, said cushioning means comprising a series of elastic rubber channels, each extending around one of the channels of said bearing means and holding the bearing channel against the spline while spacing the bearing channel from the fluted sleeve and resisting angular movement of the spline shaft relative to said sleeve, said elastic rubber channels comprising separate inserts fitting in the grooves of said tubular sleeve and extending around the metal inserts, each solid elastic rubber insert having a readily compressible radially inwardly extending side portion provided with a series of tapered radially extending grooves, whereby said last-named side portion expands circumferentially and remains in contact with the metal insert when high torque is applied to compress the other side portion of the rubber insert.

9. In an axially extensible driving connection of the character described, the combination of a torque-transmitting spline shaft having 3 to 4 splines of radially elongated cross section, a second torque-transmitting member comprising an axially elongated fluted sleeve which provides a groove for receiving each of said splines, and means mounting said sleeve substantially coaxial with said shaft for limited angular and axial movement relative to said spline shaft comprising relatively thin bearing means and elastic rubber cushioning means with a thickness several times that of said bearing means interposed between said bearing means and said sleeve, said bearing means comprising a series of axially elongated metal sheets, each extending around one of said splines to provide a flexible metal channel for engaging opposite sides of the spline while permitting axial sliding thereof, said cushiong means comprising a series of axially elongated elastic rubber sheets, each extending around one of said metal channels and fitting in the groove of said sleeve to provide a channel-shaped insert substantially filling the space between said one of said metal channels and said sleeve, both of the side portions of each rubber insert being compressed between the radially extending side face of one of said splines and one of the walls of said grooves to hold the opposite side walls of each metal channel in contact with the opposite side faces of the associated spline and to prevent axial movement of the metal channel and the rubber insert relative to said fluted sleeve.

10. A combination as defined in claim 9 wherein said elastic rubber cushioning means has a thickness about 2 to 5 times the thickness of said bearing means, each metal channel having a radially outer portion extending circumferentially at least about 30 degrees and a fluted side portion providing a clearance space between said last-named portion and the adjacent side portion of the channel-shaped rubber insert, whereby the rubber of said last-named portion flows into said clearance space when a substantial torque is transmitted by the spline shaft.

11. A combination as defined in claim 9 wherein the opposite side faces of each spline are substantially parallel and both of the side portions of each metal channel are fluted to provide clearance spaces.

References Cited in the file of this patent

UNITED STATES PATENTS

| | | |
|---|---|---|
| 1,840,714 | Guy | Jan. 12, 1932 |
| 1,906,057 | Guy | Apr. 25, 1933 |
| 2,199,926 | Swennes | May 7, 1940 |
| 2,337,287 | Williams | Dec. 21, 1943 |